United States Patent
Dancer (10) Patent No.: US 9,667,418 B2
(45) Date of Patent: May 30, 2017

(54) ELECTRONIC DATA COMMUNICATION SYSTEM WITH ENCRYPTION FOR ELECTRONIC MESSAGES

(71) Applicant: TREND MICRO INCORPORATED, Tokyo (JP)

(72) Inventor: Andrew Dancer, Bristol (GB)

(73) Assignee: Trend Micro Incorporated, Tokyo (JP)

( * ) Notice: Subject to any disclaimer, the term of this patent is extended or adjusted under 35 U.S.C. 154(b) by 687 days.

(21) Appl. No.: 13/658,572

(22) Filed: Oct. 23, 2012

(65) Prior Publication Data

US 2013/0046986 A1    Feb. 21, 2013

Related U.S. Application Data

(63) Continuation of application No. 12/162,868, filed as application No. PCT/GB2007/000300 on Jan. 30, 2007, now Pat. No. 8,321,669.

(51) Int. Cl.
*H04L 9/08* (2006.01)
*H04L 29/06* (2006.01)
*H04L 12/58* (2006.01)

(52) U.S. Cl.
CPC .......... *H04L 9/0825* (2013.01); *H04L 51/00* (2013.01); *H04L 63/045* (2013.01); *H04L 63/0471* (2013.01); *H04L 63/126* (2013.01); *H04L 2209/76* (2013.01)

(58) Field of Classification Search
CPC ... H04L 9/0819; H04L 9/0825; H04L 9/0822; H04L 9/0894; H04L 63/04; H04L 63/0428; H04L 63/0435; H04L 63/0442; H04L 63/062; G06F 21/602; G06F 21/6245; G06F 21/62; G06F 21/6218; G06F 2221/2115
See application file for complete search history.

(56) References Cited

U.S. PATENT DOCUMENTS

| | | | | |
|---|---|---|---|---|
| 5,208,858 A | * | 5/1993 | Vollert | H04L 63/0823 380/28 |
| 5,557,346 A | * | 9/1996 | Lipner | H04L 9/0894 380/285 |
| 5,737,417 A | * | 4/1998 | Buynak | H04N 5/913 380/204 |
| 5,748,735 A | * | 5/1998 | Ganesan | H04L 9/0894 380/282 |
| 6,229,894 B1 | * | 5/2001 | Van Oorschot | G06F 21/6209 709/229 |

(Continued)

*Primary Examiner* — Tae Kim
(74) *Attorney, Agent, or Firm* — Okamoto & Benedicto LLP (57) ABSTRACT

There is described an electronic data communication system in which encrypted mail messages for a recipient are sent in two parts: message data encrypted by a symmetric encryption algorithm using a session key and session key data encrypted by an asymmetric encryption algorithm using a public key associated with the recipient. If the recipient uses a webmail service to access the encrypted electronic mail message, the encrypted session key data is sent to a trusted third party server which has access to the private key of the user. The trusted third party server decrypts the encrypted session key using the private key of the user, and then sends the decrypted session key to a remote network device for decryption of the encrypted message.

7 Claims, 8 Drawing Sheets

(56) References Cited

U.S. PATENT DOCUMENTS

| | | | |
|---|---|---|---|
| 6,246,771 B1* | 6/2001 | Stanton | H04L 9/0894 380/286 |
| 6,453,416 B1* | 9/2002 | Epstein | G06F 21/32 380/30 |
| 6,760,752 B1* | 7/2004 | Liu | H04L 63/0428 709/206 |
| 6,775,382 B1* | 8/2004 | Al-Salqan | H04L 9/0894 380/280 |
| 6,823,070 B1* | 11/2004 | Smith | H04L 9/0894 380/28 |
| 6,842,523 B1* | 1/2005 | Niwa | H04L 9/0894 380/278 |
| 6,877,092 B2* | 4/2005 | Chandersekaran | H04L 9/0894 380/286 |
| 6,912,656 B1* | 6/2005 | Perlman | H04L 9/0825 709/206 |
| 6,931,133 B2* | 8/2005 | Andrews | H04L 9/0894 380/278 |
| 6,934,393 B2* | 8/2005 | Aull | G06F 21/33 380/277 |
| 7,047,411 B1* | 5/2006 | DeMello | G06F 21/10 713/164 |
| 7,437,447 B2* | 10/2008 | Brey | H04L 29/12009 380/228 |
| 7,493,661 B2* | 2/2009 | Liu | H04L 63/0428 380/259 |
| 7,921,292 B1* | 4/2011 | Pauker | H04L 9/083 713/171 |
| 2002/0016927 A1* | 2/2002 | Nagata et al. | 713/201 |
| 2002/0021804 A1* | 2/2002 | Ledzius | H04L 9/0662 380/44 |
| 2002/0078355 A1* | 6/2002 | Samar | G06F 21/6218 713/176 |
| 2002/0101998 A1* | 8/2002 | Wong | H04L 9/0894 380/286 |
| 2003/0179885 A1* | 9/2003 | Gentry et al. | 380/277 |
| 2004/0005061 A1* | 1/2004 | Buer et al. | 380/282 |
| 2004/0025057 A1* | 2/2004 | Cook | G06Q 10/107 726/28 |
| 2004/0141611 A1* | 7/2004 | Szrek et al. | 380/28 |
| 2004/0249817 A1* | 12/2004 | Liu | H04L 63/0428 |
| 2005/0071632 A1* | 3/2005 | Pauker | H04L 63/0442 713/165 |
| 2005/0132222 A1* | 6/2005 | Petrovic | H04L 9/3213 726/4 |
| 2005/0188193 A1* | 8/2005 | Kuehnel et al. | 713/155 |
| 2005/0198170 A1* | 9/2005 | LeMay | H04L 12/58 709/206 |
| 2007/0055865 A1* | 3/2007 | Kakii | 713/156 |
| 2007/0174636 A1* | 7/2007 | Raja | 713/189 |
| 2007/0183600 A1* | 8/2007 | Smart | 380/286 |
| 2007/0269041 A1* | 11/2007 | Bhatnagar | H04L 12/58 380/30 |
| 2007/0280483 A1* | 12/2007 | Fu | H04L 9/0822 380/286 |
| 2008/0022088 A1* | 1/2008 | Fu | H04L 9/0822 713/156 |
| 2008/0123850 A1* | 5/2008 | Bhatnagar | H04L 12/58 380/259 |
| 2008/0267394 A1* | 10/2008 | Nan et al. | 380/44 |
| 2009/0198997 A1* | 8/2009 | Yeap et al. | 713/155 |
| 2010/0161956 A1* | 6/2010 | Rasheed et al. | 713/150 |
| 2012/0079585 A1* | 3/2012 | Chan et al. | 726/10 |
| 2013/0311777 A1* | 11/2013 | Kolar Sundar et al. | 713/168 |

* cited by examiner

Fig. 8

ELECTRONIC DATA COMMUNICATION SYSTEM WITH ENCRYPTION FOR ELECTRONIC MESSAGES

CROSS-REFERENCE TO RELATED APPLICATION

This application is a continuation of U.S. application Ser. No. 12/162,868, filed on Jan. 23, 2009, which is a U.S. National Phase Application of PCT International Application No. PCT/GB2007/000300, filed Jan. 30, 2007, which claims the benefit of British Patent Application No. 0602131.5, filed on Feb. 2, 2006.

The above-noted disclosures are incorporated herein by reference in their entirety.

BACKGROUND OF THE INVENTION

This invention relates to an electronic mail messaging system, and in particular to a system for sending messages to and receiving messages from a person electronically.

Electronic mail messaging is widely used. It is also known to encrypt electronic mail messages using public key cryptography in which an asymmetric encryption algorithm is used. In particular, a public key associated with the recipient of an electronic mail message is used by the sender to encrypt the message. The resultant encrypted message can only be decrypted by using a private key which is different from the public key and access to which is controlled by the recipient of the message.

A problem with the asymmetric encryption algorithms utilised in public key cryptography is that they are slow in comparison with symmetric encryption algorithms in which the same cryptographic key is used for encryption and decryption. This problem has previously been addressed for electronic mail messaging by employing a so-called KEM-DEM approach in which an encrypted electronic mail message is formed by a Key Encapsulation Mechanism (KEM) part storing a session key (which is unique to the message) encrypted using the public key of the recipient, and a Data Encapsulation Mechanism (DEM) part storing the electronic mail message encrypted by a symmetric encryption algorithm using the session key stored in the KEM part as the cryptographic key. In this way, the amount of decryption performed by the asymmetric encryption algorithm is reduced.

Public key cryptography works well when the recipient always uses a private computer, i.e. one which is under the control of the recipient and is not freely accessible to the public, to access electronic mail messages.

Nowadays, "webmail" services are available which allow a user to use any computer connected to the internet to access electronic mail messages stored in a mailbox in a remote network device. Such webmail services include services in which the mailbox of the user is permanently stored on a server operated by an electronic mail messaging service provider (for example the services provided by Hotmail and Yahoo) and services which allow accessing of messages temporarily stored by an electronic mail messaging service provider pending downloading to a permanent store on a computer associated with the recipient. These webmail services allow a user to access electronic mail messages from a publicly accessible computer, for example at an internet café.

A problem with using publicly accessible computers to access electronic mail messages is that using a private key on a freely accessible computer may compromise the private key, and accordingly the use of conventional public key cryptography is not secure.

SUMMARY

According to the present invention, there is provided an electronic data communication system in which encrypted electronic mail messages for a recipient are sent using the KEM-DEM approach discussed above. When the recipient operating a first network device uses a webmail service to access an encrypted electronic mail message stored on a second network device, the part of the message storing the encrypted session key is sent to a third network device operated by a trusted third party which has access to the private key of the user. The third network device decrypts the encrypted session key using the private key of the user, and then the third party sends the decrypted session key to a remote network device, which for example could be the first network device or the second network device, where the DEM-part is decrypted using the session key to allow the user to read the message. In this way, although the trusted third party has access to the private key of the user, the trusted third party does not have access to any encrypted messages.

In an embodiment, the trusted third party is the provider of the private key for the user. In this way, it is not necessary to divulge the private key to any additional party.

In a preferred embodiment, the public key of the asymmetric encryption algorithm for the recipient of the electronic mail message is derived using publicly available information including the identity of the recipient. This allows a sender to calculate the public key for a recipient, even if at the time of sending the electronic mail message the recipient does not have a private key. Such asymmetric encryption algorithms were first proposed by Shamir in 1984, were first derived by Sakai and Kasahara in 2000, and have since been further developed by a number of research groups.

DESCRIPTION OF THE DRAWINGS

An embodiment of the invention will now be described with reference to the attached figures in which.

DETAILED DESCRIPTION

Figure 1:
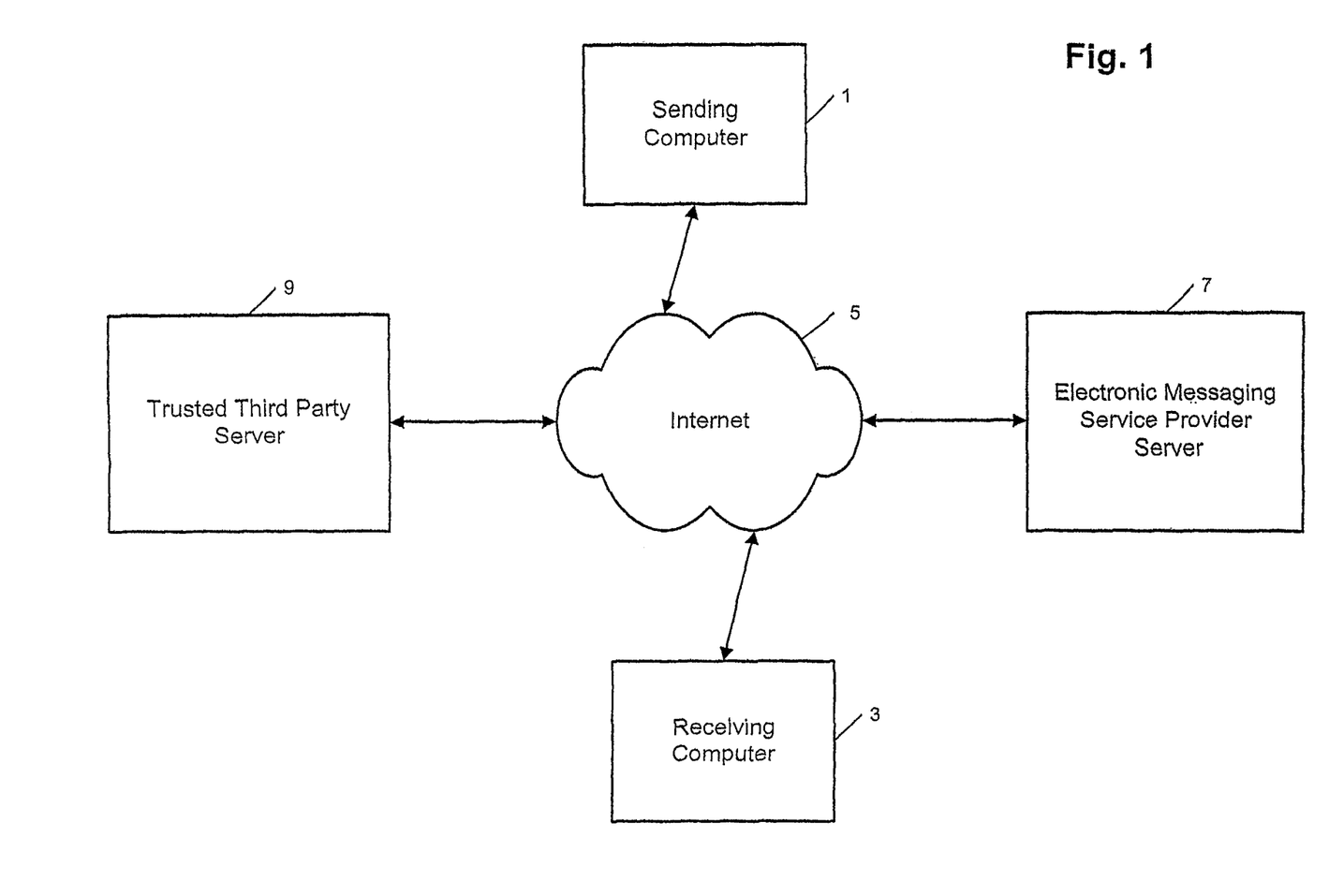
FIG. 1 schematically shows the main components of an electronic mail messaging system according to the present invention.

As shown in FIG. 1, an electronic mail messaging system has a sending computer 1, associated with the sender of an electronic mail message, and a receiving computer 3, associated with the recipient of the electronic mail message, interconnected by the internet 5. It will be appreciated that there are many other computers connected to the internet 5, and any of those computers may form a sending computer and/or a receiving computer.

In this embodiment, the recipient of the electronic mail message is a client of an electronic messaging service provider providing a webmail service. In particular, the electronic messaging service provider has a server 7 connected to the internet which stores electronic mail messages for the recipient. For the purpose of explanation, in this embodiment the electronic messaging service provider server 7, hereafter called the EMSP server, will be allotted the fictitious Uniform Resource Locator (URL) www.privatewebmail.com, and the recipient will be allotted the electronic mail address bob@privatewebmail.com.

Further, in this embodiment the recipient is a client of an encryption key authority which operates a server 9, hereafter called the trusted third party server, which is also connected to the internet. For the purpose of explanation, the trusted third party server 9 will be allotted the fictitious URL www.myencryption.com.

In this embodiment, the encryption key authority issues a public key certificate providing a root public key $K^G_{pub}$ for the encryption algorithm described in WO 03/017559, the whole contents of which is hereby incorporated herein by reference. According to this encryption algorithm, the public key $K^C_{pub}$ for a client having an electronic mail address "client_ID" is given by:

$$K^c_{pub} = F(\text{client\_ID}, K^G_{pub})$$

where F is a publicly available function. In this way, the public key associated with an electronic mail address ID can be calculated by anyone. However, the private key associated with the electronic mail address can only be calculated with knowledge of a root private key $K^G_{pri}$, which is kept secret by the encryption authority. In particular, the private key $K^C_{pri}$ for a client having an electronic mail address "client_ID" is calculated by the trusted third party server 9 in accordance with the relation:

$$K^C_{pri} = G(\text{client\_ID}, K^G_{pri})$$

where G is a function which is paired with F.

In order to send an encrypted electronic mail message to the recipient, the sending computer 1 uses the electronic mail address for the recipient and the root public key provided by the encryption authority to calculate the public key for the recipient. The sending computer 1 then generates an encrypted electronic mail message using the calculated public key for the recipient in accordance with the process disclosed in WO 2005/050908, which is hereby incorporated herein by reference.

Figure 2:
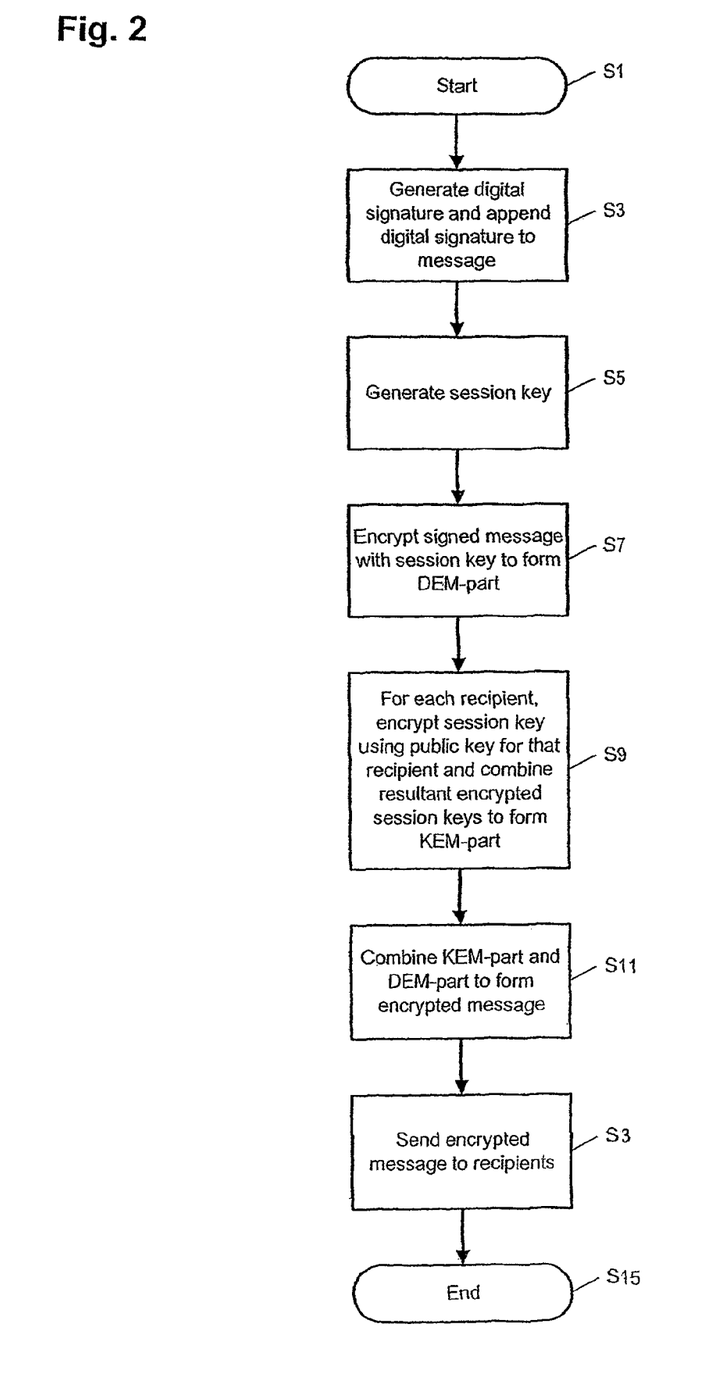
FIG. 2 is a flow chart schematically showing operations performed by a computer of a electronic mail message sender forming part of the electronic mail messaging system illustrated in FIG. 1 to send an encrypted mail message.

In summary, as shown in FIG. 2 after commencement, at S1, of the electronic mail message encryption process in response to a user instruction, the sending computer 1 generates, at S3, a digital signature and appends the digital signature to the message to form a signed message. In particular, the sending computer 1 processes the message using a one-way encryption algorithm (also referred to as a hashing function) to generate a hash value which is representative of the message, and then encrypts the hash value using the private key associated with the user of the sending computer 1.

The sending computer 1 then generates, at S5, a session key $K_s$ using a random number generator. The sending computer 1 then encrypts, at S7, the signed message using the session key $K_s$ as the cryptographic key of a symmetric encryption algorithm to form the DEM-part of the encrypted electronic mail message. In particular, in this embodiment the symmetric encryption algorithm used is the Advanced Encryption Standard (AES) algorithm.

For each recipient of the electronic mail message, the sending computer 1 encrypts, at S9, the session key $K_s$ using the public key $K^C_{pub}$ for that recipient and combines the resultant encrypted session keys to form the KEM-part of the encrypted electronic mail message. In other words, if the electronic mail message is sent to three recipients, the KEM-part will include the three encrypted versions of the session key $K_s$, each version encrypted with the public key of a respective different recipient.

The sending computer 1 then combines, at S9, the KEM-part and the DEM-part to form the encrypted electronic mail message. Finally, the sending computer 1 sends, at S13, the encrypted electronic mail message to the recipients.

As discussed above, the recipient associated with the receiving computer 3 has an account at the electronic messaging service provider associated with the EMSP server 7. The encrypted electronic message is therefore directed to the EMSP server 7 form where it can be accessed using any computer.

Figure 3:
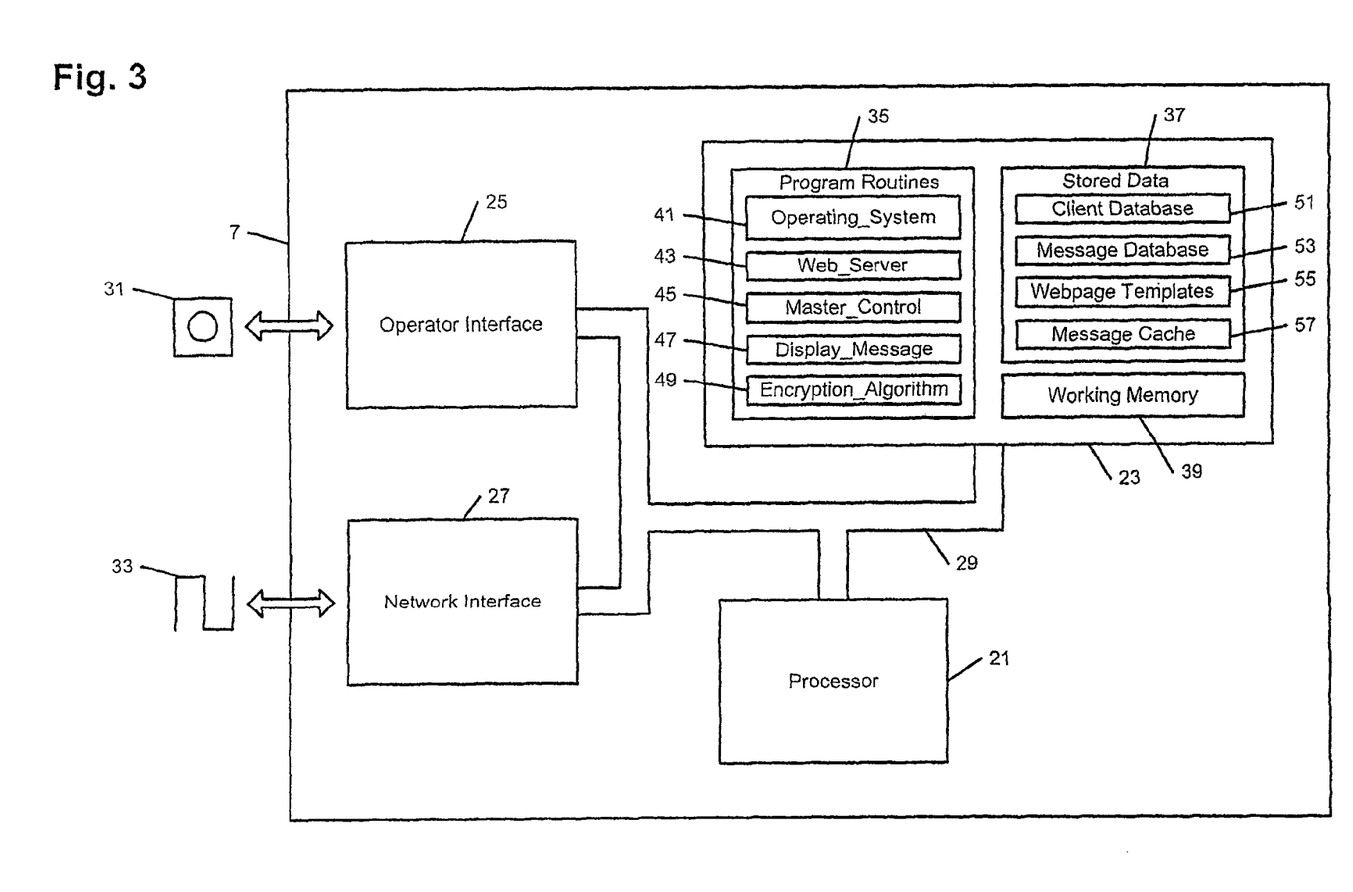
FIG. 3 schematically shows the main components of an electronic messaging service provider server forming part of the electronic mail messaging system illustrated in FIG. 1.

FIG. 3 schematically shows the main components of the EMSP server 7. As shown, the EMSP server 7 has a processor 21, memory 23, an operator interface 25 and a network interface 27 interconnected by a bus system 29.

In this embodiment, the operator interface 25 includes a keyboard for allowing an operator to enter data into the EMSP server 7 and a display for allowing an operator to read data produced by the EMSP server 7. The operator interface 25 also includes a CD-ROM reader/writer via which data stored on a CD-ROM 31 can be input into the EMSP server or data can be written onto a recordable CD-ROM 31.

The network interface 27 receives data from remote devices, and outputs data to remote devices, in the form of a network signal 33.

The processor 21 performs processing operations in accordance with program routines stored in the memory 23. These program routines may be either stored during manufacture, or input to the EMSP server 7 via the operator interface 25 or the network interface 27. The program routines process data stored in the memory 23 and data received via the operator interface 25 or the network interface 27.

As those skilled in the art will appreciate, as is conventional the memory 23 is formed by different forms of memory, each having different access times for retrieving data stored therein. For example, the memory includes hard drive regions with a comparatively slow access time and a random access memory (RAM) regions having a comparatively fast access time. Conventional processing techniques are employed to improve speed of processing by caching data likely to be required into RAM in advance.

The memory 23 includes a region 35 storing the program routines used by the EMSP server 7, a region 37 storing data and a region 39 providing working memory.

In particular the program routines memory region 35 stores:
- an Operating_System 41 for interfacing between the software routines and the hardware components of the server 7;
- a Web_Server 43 for providing web server functionality;
- a Master_Control routine 45;
- a Display_Message sub-routine 47; and
- an Encryption_Algorithm routine 49 (in this embodiment the AES encryption algorithm).

The stored data memory region 37 stores:
- a client database 51 which stores user name, email address and logon information (e.g. password) for each client;
- a message database 53 storing messages including sender and recipient electronic mail addresses;
- webpage templates which are used by the Web_Server 43 when forming web pages to be sent to a browser program; and
- a message cache 57 for storing the DEM-part of encrypted messages while awaiting the session key as will be described hereafter.

When a client at a receiving computer 3 wishes to access electronic mail messages stored in the EMSP server 7, the client uses a conventional browser program on the receiving computer (for example Microsoft Internet Explorer) to send an access request to the EMSP server 7 by entering the URL for the EMSP server 7 (i.e. in this embodiment www.privatewebmail.com.

Figure 4:
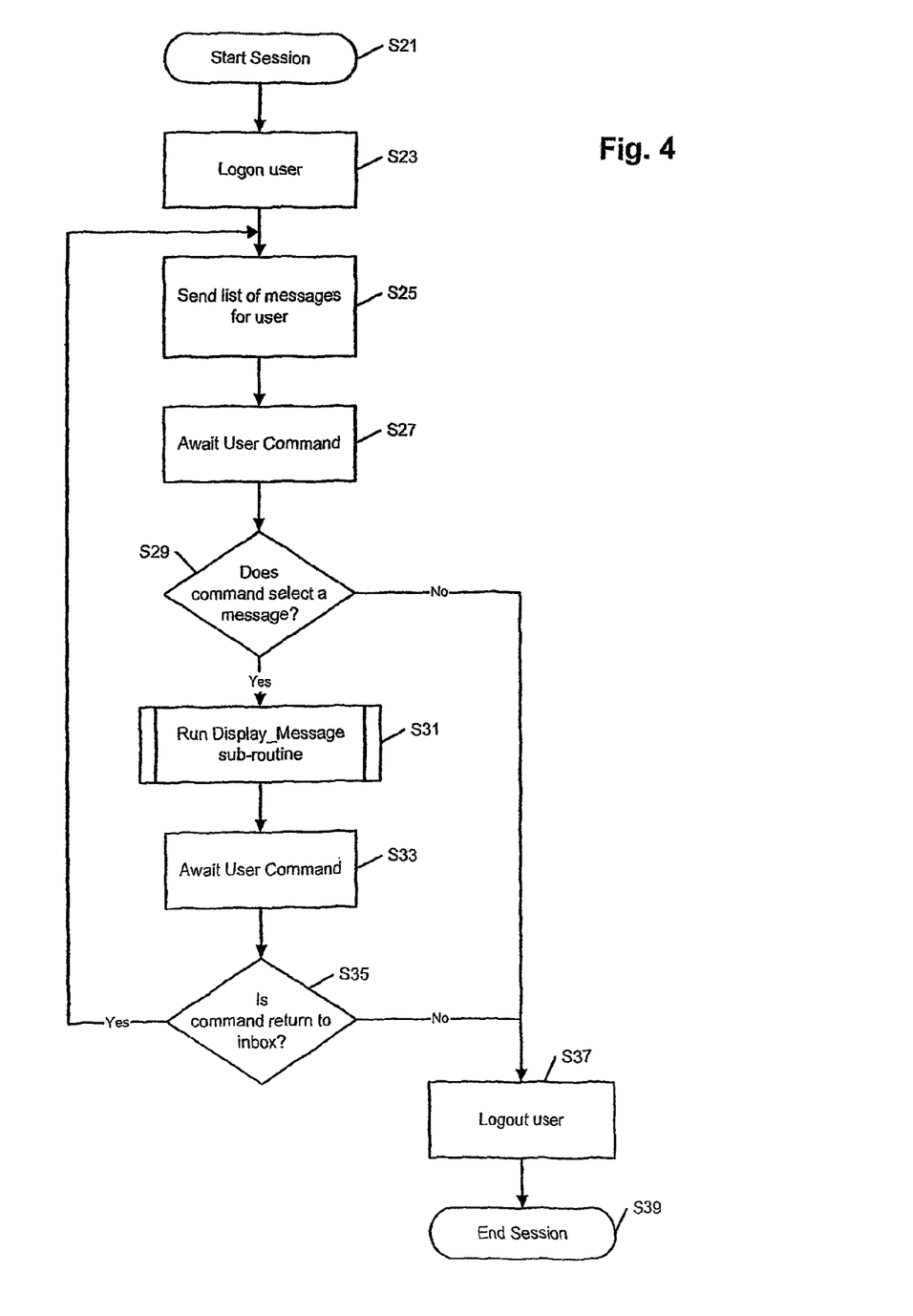
FIG. 4 is a flow chart schematically showing operations performed by the electronic messaging service provider server illustrated in FIG. 3.

In response to receipt of the access request, the Master_Control routine 45 initiates a web session. FIG. 4 is a flow chart showing the main steps performed in a web session.

After initiation, at S21, of the web session, the EMSP server 7 performs, at S23, a logon procedure. In particular, the EMSP server 7 sends logon web page data from the webpage templates 55 to the receiving computer 3 which causes a logon web page having data entry boxes for the client to enter their electronic message address and logon information. The entered electronic message address and logon information is then sent by the receiving computer 3 to the EMSP server 7, which compares the received data with corresponding data stored in the client database 51 to verify the identity of the client.

After the identity of the client has been verified, the EMSP server 7 sends, at S25, web page data for a web page which displays a list of the messages for the client stored in the message database 53. In particular, the EMSP server 7 queries the message database 53 for messages for which the client is a named recipient, and enters data including the sender field, the title field, the time sent field and the message size field for the identified messages into a web page template stored in the webpage templates memory region 55. In this embodiment, the title for each message forms a hyperlink, using conventional HTML programming techniques, for accessing the corresponding message in the message database 55. In addition to the list of messages, the web page also displays a logout button for ending the web session.

After sending the web page data for displaying the list of messages to the receiving computer 3, the EMSP waits, at S29, for the next command from the receiving computer 3. On viewing the web page displaying the list of messages and the logout button, the client has the choice of either selecting a message for viewing by clicking on the title of the selected message, or pressing the logout button to end the web session.

On receiving a command from the receiving computer 3, the EMSP server 7 checks, at S29, if the command corresponds to the selection of a message for display. If the command does not correspond to the selection of a message for display (in other words the client has pressed the logout button), the EMSP server 7 logs out, at S37, the client and the web session ends, at S39.

If the command does correspond to the selection of a message for display, the Master_Control routine 45 initiates, at S31, the Display_Message sub-routine which will be described in more detail hereafter. This results in web page data for displaying the message being sent to the receiving computer 3 together with a data for displaying a button for returning to the list of messages and a logout button. The EMSP server 7 then waits, at S35, for the next command from the receiving computer 7.

On receipt of the next command, the EMSP server 7 checks, at S35, whether the command corresponds to the client at the receiving computer 7 pressing the button requesting the list of messages to be re-displayed or pressing the logout button. If the command corresponds to a request for re-display of the list of messages, the EMSP server 7 re-sends the web page data for the list of messages (S25). If the command corresponds to a request to logout, the EMSP server 7 logs out, at S37, the client and the web session ends at S39.

Figure 5:
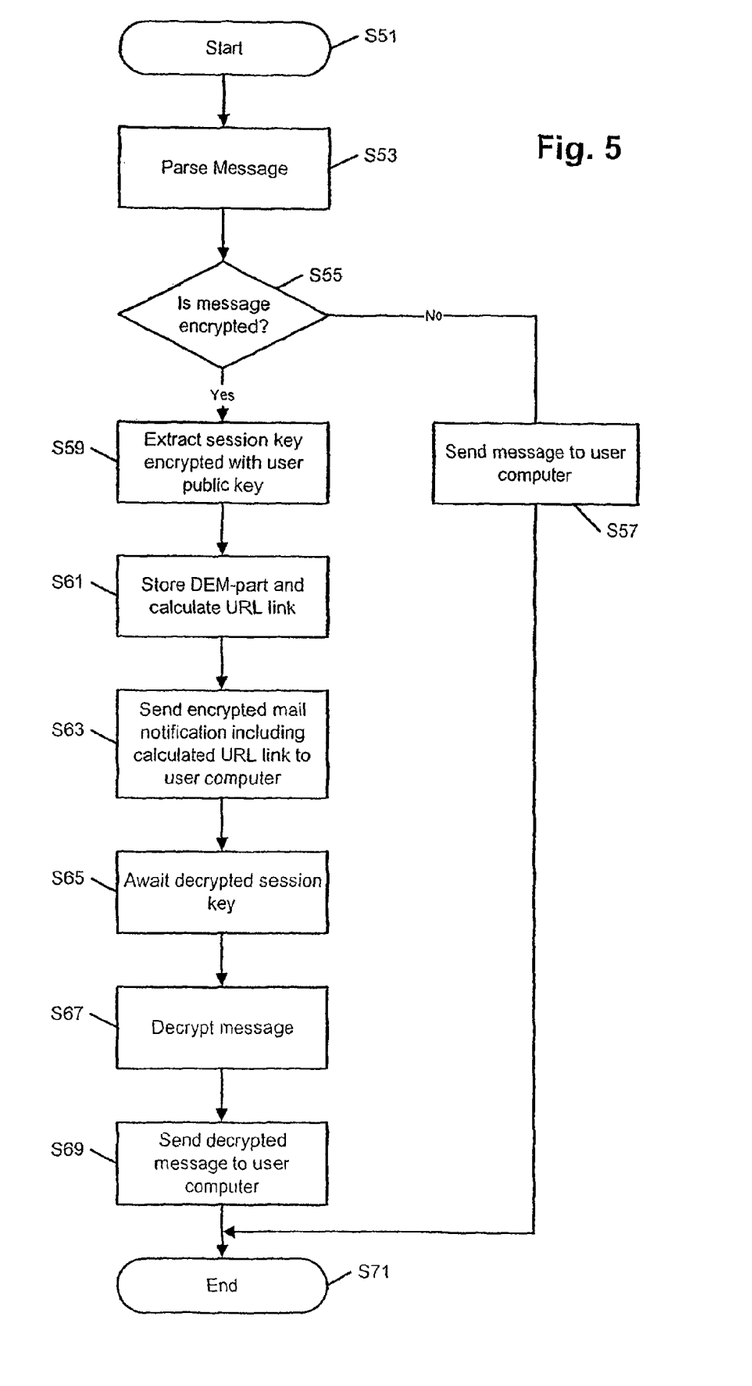
FIG. 5 is a flow chart schematically showing in more detail operations performed by the electronic messaging service provider server illustrated in FIG. 3 to display a selected message to a user.

The Display_Message sub-routine 47 will now be described in more detail. As shown in FIG. 5, on initiation, at S51, of the Display_Message sub-routine 47 in response to the selection of a message for viewing, the EMSP server 7 parses, at S53, the selected image to check whether of not it is encrypted. In particular, the EMSP server 7 looks for a byte sequence within the selected message which is indicative of an encrypted message.

If the EMSP server 7 decides the selected message is not encrypted, then the EMSP server 7 sends, at S57, web page data for displaying the message to the receiving computer along with the "return to inbox" button and logout button, and then the Display_Message sub-routine 47 ends at S71.

If the EMSP server 7 decides the selected message is encrypted, the EMSP server 7 extracts, at S59, from the KEM-part of the message the version of the session key which has been encrypted using the public key of the client at the receiving computer 3. The EMSP server 7 then, at S61, stores the DEM-part in the message cache 57 and calculates a URL link for directing the browser program of the receiving computer 3 to the trusted third party server 9 and conveying the information needed by the trusted third party server 9 to recover the session key and send the session key to EMSP server 7. An example of such a URL is as follows:

https://www.myencryption.com/webmail/?user=bob@
  privatewebmail.com&key=fnf94338b3b8b43fb93n4-
  3n&date=20051229110300&returnurl=www.private-
  webmail.com/ViewPPMessage?MessageID=12345

The format of this URL will now be explained:

https://www.myencryption.com/webmail/—establishes an encrypted web session with the trusted third party server and indicates that decryption of a session key is required;

user=bob@privatewebmail.com—indicates the identity of the client at the receiving computer 3 to facilitate logging on at the trusted third party server 9;

key=fnf94338b3b8b43fb93n43n—provides the encrypted session key;

date=20051229110300—provides the date and time of day on which the selected message was sent so that the correct root private key is selected;

returnurl=www.privatewebmail.com/ViewPPMessage—gives the web address to which the decrypted session key is to be forwarded; and MessageID=12345—indicates the message within the message cache 57 which is to be decrypted using the session key.

The EMSP server 7 then sends, at S61, web page data to the receiving computer 3 for displaying a web page indicating that the message is an encrypted message and requesting the client at the receiving computer 3 to click on the calculated URL link. The EMSP server 7 then waits, at S65, for the decrypted session key.

The manner in which the trusted third party server 9 decrypts the session key will now be described with reference to FIGS. 6 and 7.

Figure 6:
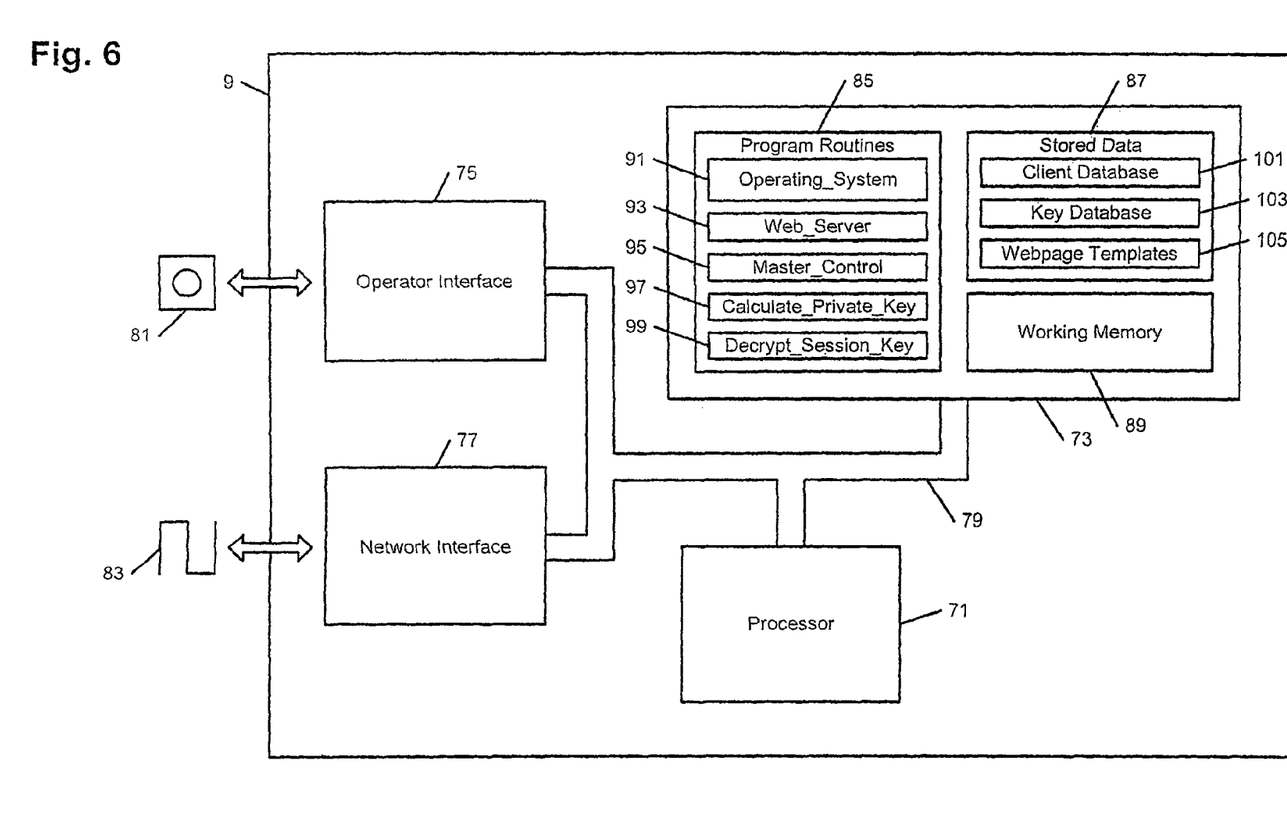
FIG. 6 schematically shows the main components of a trusted third party server forming part of the electronic mail messaging system illustrated in FIG. 1.
Figure 7:
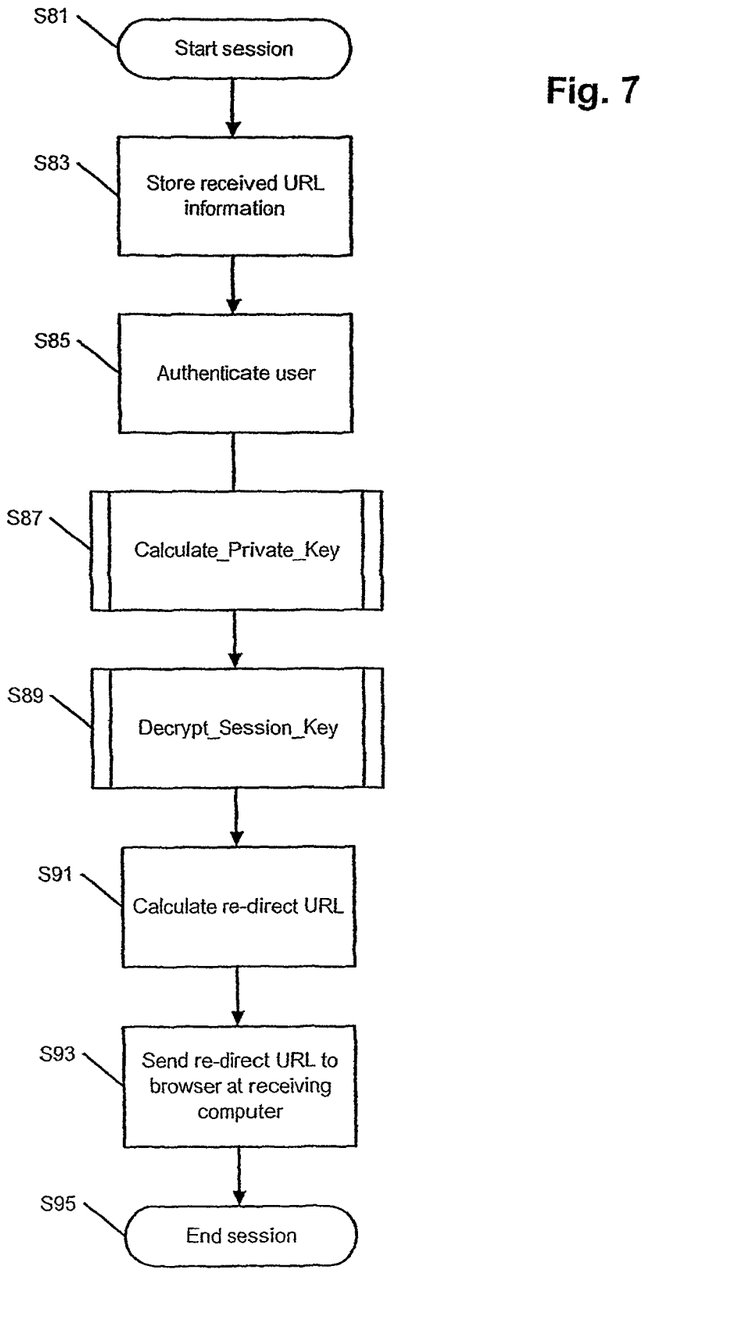
FIG. 7 is a flow chart schematically showing operations performed by the trusted third party server illustrated in FIG. 6.

As shown in FIG. 6, the trusted third party server 9 has a processor 71, memory 73, an operator interface 75 a network interface 77 interconnected by a bus system 79. The functions of the processor 71, the operator interface and the network interface are the same as the corresponding components of the EMSP server 7, and therefore will not be described again in detail beyond stating that the operator interface allows data to be transferred to and from a CD-ROM 81 and the network interface 77 allows data to be transferred to and from remote network devices in the form of network signals 83.

The memory 73 includes a region 85 storing the program routines used by the trusted third party server 9, a region 87 storing data and a region 89 providing working memory.

In particular the program routines memory region 85 stores:
- an Operating_System 91 for interfacing between the software routines and the hardware components of the server 9;
- a Web_Server 93 for providing web server functionality;
- a Master_Control routine 95;
- a Calculate_Private_Key sub-routine 97; and
- a Decrypt_Session_Key sub-routine 99.

In this embodiment, the Calculate_Private_key sub routine and the Decrypt_Session_Key sub-routine utilise the encryption algorithm discussed in WO 03/017559 and accordingly will not be discussed in detail.

The stored data memory region 37 stores:
- a client database 101 which stores user name, email address and logon information for each client;
- a key database which stores a table indicating the root private key for each time period; and
- webpage templates which are used by the Web_Server 93 when forming web pages to be sent to a browser program.

In response to the signal sent by the receiving computer 3 when the client at the receiving computer 3 clicks on the URL link provided by the EMSP server 7, the trusted third party server 9 starts, at S81, a web session. Firstly, the third party server 9 stores, at S83, the information attached to the URL and then authenticates, at S85, the identity of the client. In this embodiment, authentication is performed by sending a web page requesting randomly selected components of the logon information stored for that client in the manner adopted by many online banking websites. In this way, the requested logon information changes for each successive logon which protects against the entered information being copied, either by looking over the shoulder of the client at the receiving computer 3 or by intercepting the network signals between the receiving computer 3 and the trusted third party server 9, and subsequently used to impersonate the client.

After authenticating the user, the trusted third party server 9 initiates, at S87, the Calculate_Private_Key sub-routine 97 which calculates the private key associated with the client for decrypting the encrypted session key using the client identification information and the root private key stored in the key database 103 for the time period when the message was sent. The trusted third party server then initiates, at S89, the Decrypt_Session_Key sub-routine 99 which uses the calculated client private key to decrypt the encrypted session key.

The trusted third party server then calculates, at S91, a re-direct URL for sending to the receiving computer 3. An example of such a re-direct URL is as follows:
  https://www.privatewebmail.com/ViewPPMessage?MessageID=12345&Key=4n9gn9gn94n9ghjy
The format of this URL will now be explained:
  www.privatewebmail.com/ViewPPMessage?MessageID=12345 the return URL provided by the EMSP server 7 which identifies the message within the message cache 57 of the EMSP server 7 which is to be decrypted using the session key; and
  Key=4n9gn9gn94n9ghjy—the decrypted session key.

The trusted third party server 9 then sends, at S93, the re-direct URL to the browser at the receiving computer 3 and then ends, at S95, the web session.

On receiving the re-direct URL, the browser at the receiving computer 3 automatically sends a request for the URL, the request including the decrypted session key, to the EMSP server 7.

Returning to FIG. 5, on receiving the decrypted session key, the EMSP server 7 uses, at S67, the decrypted session key to decrypt the DEM-part of the message stored in the message cache 57 (the message being identified in the URL). The EMSP server 7 then sends web page data for displaying the decrypted message to the receiving computer 3, and the Display_Message sub-routine 47 ends at S71.

As described previously, the DEM-part of the encrypted message stores the original message and a digital signature. In this embodiment, both the original message and the digital signature are transmitted by the EMSP server 7 to the receiving computer 3. The integrity of the original message (i.e. whether it is has been tampered with) is checked by the receiving computer 3 using the digital signature in a conventional manner. In particular, the receiving computer 3 applies the same hash function as was used by the sending computer 1 when generating the digital signature to form a test hash value, and decrypts the digital signature using the public key associated with the sender to generate a reference hash value. If the test hash value is identical to the reference hash value, then the integrity of the message is verified.

As described above, neither the EMSP server 7 nor the receiving computer 3 have access to the private key of the client. Therefore, even if the security of the session key for a selected message is compromised, the security of any of the other messages for the client stored by the EMSP server is not compromised because those messages employ different session keys which can only be recovered with knowledge of the private key of the client. In this way, if the receiving computer 3 is in an internet café or the like a client of the electronic messaging service provider is able to view an encrypted message safe in the knowledge that only the security of that encrypted message may be compromised, a risk which is in any case inevitable if the message is to be viewed using a publicly accessible computer.

Further, the trusted third party server 9 does not have access to the DEM-part of the encrypted message. Accordingly, the trusted third party is unable to view surreptitiously the contents of the electronic messages for the client.

An advantage of the above-described embodiment is that the receiving computer requires only a conventional browser program. Accordingly, computers in internet cafes and the like can be used without the need for any form of modification.

Modifications and Further Embodiments

In the above-described embodiment, the sending computer 1 generates a digital signature using the private key of the sender. However, if the sending computer 1 is publicly accessible (for example in an internet café) then this would compromise the security of the private key of the sender. In an alternative embodiment, in order to generate the digital signature the sending computer 1 generates the hash value, but then sends the hash value to the trusted third party server for encryption with the private key of the sender. In an embodiment, this is done by sending a request to the trusted third party server formed by a URL having the hash value and a return URL appended thereto. The operations performed by the trusted third party server on receipt of the URL with the hash value appended will now be described with reference to FIG. 8.

Figure 8:
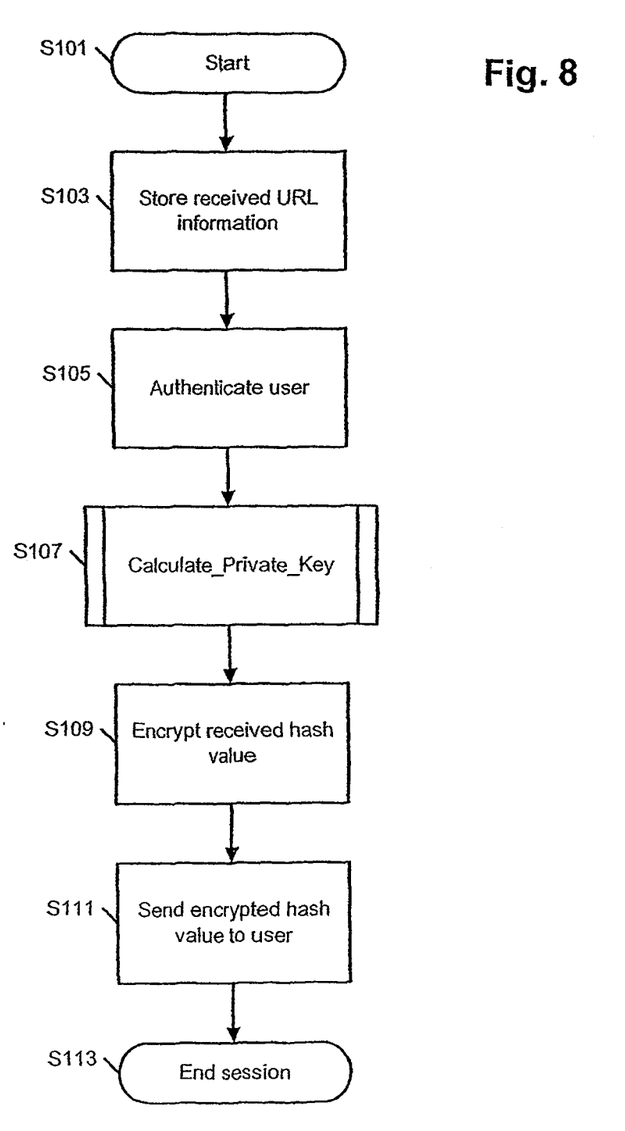
FIG. 8 is a flow chart schematically showing operations performed by an alternative trusted third party server to generate a digital signature.

The trusted third party server starts, at S101, a web session on receipt of the URL, and stores, at S103, the received URL information. The trusted third party server then authenticates, at S105, the user in the same manner as described with reference to FIG. 7. After authenticating the user, the trusted third party server initiates, at S107, the Calculate_Private_Key sub-routine which calculates the private key associated with the user using user identification information and the root private key stored in the key database. The trusted third party server then encrypts, at S109, the received hash value using the calculated private key to generate a digital signature. The trusted third party server then sends, at S111, the digital signature to the return URL and the web session ends at S113.

While in the described embodiment the original message is signed and then encrypted, it will be appreciated that in an alternative embodiment the original message could be encrypted and then the encrypted message could be signed.

In the above described embodiment, the trusted third party sends the decrypted session key to the receiving computer 3, which automatically re-directs the session key to the EMSP server 7 where the message is decrypted. In alternative embodiments, the DEM-part of the encrypted message is forwarded by the EMSP server 7 to the receiving computer 3 for decryption at the receiving computer 3 using the decrypted session key. This has the advantage that the EMSP server 7 does not have access to the decrypted message. However, this also has the disadvantage of requiring that the receiving computer 3 has additional functionality in order to perform the decryption.

In a further alternative embodiment, the decrypted session key and the DEM-part of the encrypted message are forwarded to a remote computer other than the EMSP server 7 and trusted third party server 9 for decryption, and then the decrypted message sent to the receiving computer 3.

In the illustrated embodiment, when the EMSP server 7 detects an encrypted message the client is advised and a URL link is provided which is clicked by the client to initiate decryption. This is advantageous because the client can decide whether the receiving computer is sufficiently secure to receive the decrypted message. In an alternative embodiment, a configuration option could be provided to redirect the client directly to the trusted third party server 9 on detection of an encrypted message. This has the advantage of reducing the "click count", but is less transparent to the client.

In the illustrated embodiment, on detecting an encrypted message the EMSP server 7 extracts from the KEM-part of the encrypted message just the version of the session key encrypted with the private key for the client. In an alternative embodiment the EMSP server could send the entire KEM-part to the receiving computer 3 for forwarding to the trusted third party server 9. However, if the encrypted message has a large number of recipients this would lead to a significant increase in network traffic.

In the illustrated embodiment, the trusted third party server 9 stores the root private keys and calculates the private client key using the client identity and the root private key. However, all that is necessary is that the trusted third party server 9 has access to the client private key. Accordingly, in alternative embodiments the trusted third party server 9 could directly store the private keys for each client, or alternatively access the desired private key for a client from a separate device.

In the illustrated embodiment, the asymmetric encryption algorithm discussed in WO 03/017559 is used. In this algorithm, the public key for a client is calculated using from the identity of the client and a root public key. It will be appreciated that alternative algorithms with the same overall functionality could be used, for example the algorithm discussed in "ID based cryptosystems with pairing on elliptic curve" by R. Sakai and M. Kasahara, Cryptology ePrint archive, Report 2003/054 and the algorithm discussed in "An Efficient ID-KEM Based On the Sakai-Kasahara Key Construction" by Chen et al, Cryptology ePrint archive, Report 2005/224 (both of which publications are hereby incorporated herein by reference).

Further, the asymmetric encryption algorithm need not determine the public key for a client using the client identity, and any asymmetric encryption algorithm, for example the RSA algorithm, could be used. Similarly, although the illustrated embodiment uses the AES encryption algorithm to encrypt the DEM-part, other symmetric encryption algorithms, for example the DES algorithm, could be used.

While in the illustrated embodiment, an internet-based implementation of the invention has been described, it will be appreciated that the invention could be used in computer networks which are not connected to the internet. For example, an organisation may have an internal network embodying the invention, in which case an employee of the invention could access electronic messages from any computer.

In the described embodiment, each client for the EMSP server 7 has a username. It will be appreciated that in an embodiment the email address for the client could be utilised as the user name.

In the described embodiment, the receiving computer 3 is a conventional personal computer. It will be appreciated that the receiving computer 3 could be formed by other types of computer apparatus such as a thin client or a personal digital assistant (PDA).

Although the described embodiment of the invention comprises computer apparatus and processes performed in the computer apparatus, the invention also extends to computer programs, particularly computer programs on or in a carrier, adapted for putting the invention into practice. The program may be in the form of source code, object code, a code intermediate source and object codes such as in a partially compiled form, or in any other form suitable for using the implementation of the processes according to the invention.

The carrier may be any entity or device capable of carrying the program. For example, the carrier may comprise a storage medium, such as a ROM, for example a CD-ROM or a semi-conductor ROM, or a magnetic recording medium, for example a floppy disk, or a hard disk. Further, the carrier may be a transmissible carrier such as an electronic or optical signal which may be conveyed via electrical or optical cable or by radio or other means.

When the program is embodied in a signal which may be conveyed directly by cable or other device or means, the carrier may be constituted by such cable or other device or means. Alternatively, the carrier may be an integrated circuit in which the program is embedded, the integrated circuit being adapted for performing, or for use in the performance of, the relevant processes.

Although in the described embodiments the invention is implemented using software, it will be appreciated that alternatively the invention could be implemented using hardware devices, or a combination of hardware devices and software.

The invention claimed is:

1. A network server comprising:
a data store operable to store encrypted electronic messages for a recipient comprising i) encrypted message data corresponding to a message for the recipient encrypted by a symmetric encryption algorithm using a session key and ii) encrypted session key data corresponding to the session key encrypted by an asymmetric encryption algorithm using a public key of the recipient;
a network interface operable to receive data from and transmit data to remote network devices; and
a processor operable, following receipt of a request to access an encrypted electronic message, to extract said encrypted session key data from the requested electronic message and forward the extracted encrypted session key data but not the requested encrypted electronic message to a remote network device.

2. The network server according to claim 1, wherein the processor is operable to generate link data comprising the encrypted session key data and a network address for an encryption key server.

3. The network server according to claim 2, wherein the processor is operable to generate link data further comprising a redirect network address.

4. The network server according to claim 2, wherein the processor is operable to generate link data further comprising identification data for the recipient.

5. The network server according to claim 2, wherein the processor is operable to generate link data further comprising time data identifying a time period during which the encrypted electronic message was sent.

6. The network server according to claim 2, wherein the link data comprises a uniform resource locator.

7. The network server according to claim 6, wherein the processor is operable to incorporate the generated uniform resource locator in web page data.

* * * * *